United States Patent
Yoshiike et al.

(10) Patent No.: US 8,021,596 B2
(45) Date of Patent: Sep. 20, 2011

(54) METHOD FOR INJECTION STRETCH BLOW MOLDING

(75) Inventors: Yutaka Yoshiike, Nagano-ken (JP); Kazuhide Hasegawa, Nagano-ken (JP); Shoji Miyashita, Nagano-ken (JP)

(73) Assignee: A. K. Technical Laboratory, Inc., Nagano-ken (JP)

( * ) Notice: Subject to any disclaimer, the term of this patent is extended or adjusted under 35 U.S.C. 154(b) by 74 days.

(21) Appl. No.: 11/451,612

(22) Filed: Jun. 12, 2006

(65) Prior Publication Data

US 2006/0290035 A1    Dec. 28, 2006

(30) Foreign Application Priority Data

Jun. 13, 2005   (JP) ................................. 2005-172588

(51) Int. Cl.
  *B29C 39/02*  (2006.01)
(52) U.S. Cl. ...................................................... 264/537
(58) Field of Classification Search .................. 264/537
  See application file for complete search history.

(56) References Cited

U.S. PATENT DOCUMENTS

| | | | |
|---|---|---|---|
| 5,364,585 A | | 11/1994 | Takeuchi |
| 5,578,262 A | * | 11/1996 | Marcus ......................... 264/532 |
| 5,589,130 A | * | 12/1996 | Takada et al. ................. 264/537 |
| 5,744,176 A | * | 4/1998 | Takada et al. ................. 425/526 |
| 6,848,899 B2 | * | 2/2005 | Takada et al. ................. 425/526 |

* cited by examiner

*Primary Examiner* — Christina Johnson
*Assistant Examiner* — Larry Thrower
(74) *Attorney, Agent, or Firm* — Weingarten, Schurgin, Gagnebin & Lebovici LLP (57) ABSTRACT

In the hot parison method of stretch blow molding, the temperature distribution of the body wall of the injection molded preform is changed to a gentle gradient slope shape from a mountain shape not by the external application of heat, but by the preform itself, to prepare a bottle with an improved top load value. After the injection-molded preform is released from the mold, cooling of the inner side of the preform is continued by the injection core. Inner side cooling is terminated by release from the injection core. The preform is left in a hollow state for a time, the temperature-averaging time, until the outer surface temperature drops to the stretch blow molding temperature, after passing a peak temperature. While in the molding temperature region, stretch blow molding of the thin-wall hollow molded article is conducted.

1 Claim, 8 Drawing Sheets

METHOD FOR INJECTION STRETCH BLOW MOLDING

This application claims priority to Japanese application No. 2005-172588 filed Jun. 13, 2005.

BACKGROUND OF THE INVENTION

1. Field of the Invention

The present invention relates to a method in which an injection molded preform is transferred to a blow mold and is stretch blow molded to a thin-wall hollow molded article such as a bottle or a wide-mouth container and the like.

2. Description of the Related Art

Injection stretch blow molding is known in which material resins such as polyethylene terephthalate (PET), polypropylene (PP), polycarbonate (PC), polyethylene (PE) and the like are carried as a melt by an injection apparatus and injected to fill a cavity of an injection mold. A closed-end preform, in which a body part and a neck part are integrally molded by the injection mold, is transferred to a blow mold by releasing from the injection mold while in a high temperature state. In the blow mold, by means of elongation of a stretch rod and air blowing, the preform is formed into a packaging container such as a bottle having a thin-wall body part or a wide-mouth container and the like.

Among injection stretch blow molding methods, a method has been disclosed in which a preform is released from an injection cavity mold and an injection core, and is transferred to a blow mold while a neck part of the preform is supported by a neck mold (U.S. Pat. No. 5,364,585). Also, with the object of shortening the injection molding time, a method has been disclosed in which a preform is released from an injection cavity mold while being supported by an injection core and neck mold, and cooling of the preform is continued while simultaneously transferring the preform to a blow mold (U.S. Pat. No. 5,589,130).

The above mentioned conventional method, in which an injection molded preform is stretch blow molded immediately while in a high temperature state, is called a hot parison method or one-stage method, as contrasted with a cold parison method, in which an injection molded solid preform is heated to the mold temperature at stretch blow molding. With the cold parison method, since a body part and a bottom part except a neck part are heated by external heating, the difference between high and low temperatures in the wall part during stretch blow molding is small and a large difference does not occur in the degree of molecular orientation generated by the stretch, so that a bottle having a high top load value can be obtained.

In the case of the hot parison method, since the preform is in a high temperature state from being injection molded, the temperature distribution in a cross section of the body wall has a mountain shape, in which the temperature of the central part is high compared with the cooled inner and outer sides, and the temperature difference is large. The temperature difference becomes smaller during stretch blow molding, but is not eliminated completely. The temperature difference influences the compression strength as a result of the difference in degree of molecular orientation by the stretch, so that the top load value is considered incapable of being as much as the value by the cold parison method.

As a means to shorten the cooling time after injection, in the case of the conventional method in which the preform is released from the injection cavity mold together with the injection core, and core cooling is continued even after the mold-release by cooling at the inner side by the injection core, a temperature difference occurs between the inner and outer sides, so that the temperature distribution changes from a mountain shape to a slope shape with the temperature gradient having a lower inner side temperature. But along with the cooling time, the temperature difference between the inner and outer sides grows larger and the temperature gradient is steep. Also, since a thick inner side skin layer is formed, stretch blow molding is difficult with the steep gradient temperature distribution, so that a bottle with a good molding state can not be obtained.

In the slope-shaped temperature distribution in which the temperature is lower toward the inner side of the body wall, since there is no protruding high temperature as with the mountain shape, it is difficult to generate a multiple layer formation from the difference of degree of orientation caused by stretching. Accordingly, if by some measure the inner and outer side temperatures can be made nearer, to make the temperature distribution a gentle gradient, such as in the cold parison method, then even considering the hot parison method, a bottle having a high top load value can be molded.

As for polyethylene terephthalate, for which the whitening phenomenon of the preform is not generated if the outer surface temperature is 100° C. or more, a greater improvement can be provided if the stretch blow molding can be conducted at a higher mold temperature than described in the conventional method.

SUMMARY OF THE INVENTION

Accordingly, the inventors have discovered a new method such that if the temperature of the injection molded preform is 100° C. or more at the outer surface, the inner side temperature of the preform, cooled by the injection core, followed by a rise of temperature by heat from the internal part, can get near to the outer side temperature drop by heat dissipation, and also the preform temperature can be kept for a longer period in the temperature region for stretch blow molding.

Accordingly an object of the present invention is to provide a new method such that the temperature distribution of the inner side of the body wall of the injection molded preform is changed to a gentle gradient slope shape temperature distribution from the mountain shape, not by the external application of heat, but by the preform itself, so that using the hot parison method, a bottle with an improved top load value can be provided by stretch blow molding.

The present invention is a method for injection stretch blow molding, which comprises the steps of:

injecting and filling a molten material resin into a cavity formed by an injection cavity mold, a neck mold, and an injection core;

forming a closed-end preform having an integral body part and a neck part, by cooling the melt in the cavity by both heat transfer contact between the injection cavity mold and an outer side of the body part and heat transfer contact between the injection core and an inner side of the body part;

mold-releasing the preform from the injection cavity mold together with the injection core while the body part and a bottom part are in a high temperature state;

continuing cooling the inner side of the preform by heat transfer contact with said injection core while simultaneously transferring the preform with the injection core;

terminating the cooling of the inner side of the preform by mold-release of the injection core after halting the transfer;

holding the preform at the neck part after mold-release of the injection core for a holding time, the holding time comprising a temperature-averaging time of the preform during which an outer surface temperature of said preform passes a peak temperature and then drops to a predetermined stretch blow molding temperature; and stretch blow molding the preform to a thin-wall hollow molded article in the stretch blow molding temperature region.

Further, the present invention is a method for injection stretch blow molding, which comprises the steps of:

injecting and filling a molten polyethylene terephthalate into a cavity formed by an injection cavity mold, a neck mold, and an injection core;

forming a closed-end preform having an integral body part and a neck part, with the body part having a thickness of 3 mm to 5 mm, by cooling the melt for 2 seconds to 10 seconds in the cavity set to a temperature of 3° C. to 20° C., by both heat transfer contact between the injection cavity mold and an outer side of the body part and heat transfer contact between the injection core and an inner side of the body part;

mold-releasing the preform from the injection cavity mold together with the injection core while the body part and a bottom part are in a high temperature state;

continuing cooling the inner side of the preform by heat transfer contact with said injection core for 4 seconds to 14 seconds depending on the body part thickness while simultaneously transferring the preform with the injection core;

terminating the cooling of the inner side of the preform by mold-release of the preform from the injection core;

holding the preform at the neck part after mold-release of the injection core for a holding time, the holding time comprising a temperature-averaging time of the preform during which an outer surface temperature of said preform passes a peak temperature and then drops to a predetermined stretch blow molding temperature of between 133° C. to 100° C.; and stretch blow molding the preform in the stretch blow molding temperature region to the thin-wall hollow molded article of the body part with a thickness t' having an average thickness of 0.28 mm to 0.33 mm.

DETAILED DESCRIPTION OF THE PREFERRED EMBODIMENT

FIGS. 1A, 1B, 2A and 2B illustrate one example of a mold apparatus used for the stretch blow molding method according to the present invention.

An injection cavity mold 1 molds the outer side of a closed-end perform 10 and has a cooling channel in an internal part and an injection nozzle 2 at a bottom part. In an opened upper side of the injection cavity mold 1, neck molds 3 which form a neck part of the perform 10 are provided at the under side of a base plate 4 to open and close from the right and left.

An injection core 5 molds the inner side of the perform 10 and extends in a downward direction from the under side of a clamping block 6, which is movable up and down at the upper part of the injection cavity mold 1. A cooling channel is provided in an internal part of the injection core 5. The clamping block 6 is provided with a transfer plate which moves 180° reciprocatingly and is movable up and down, not shown in the drawings. By the transfer plate, the injection core 5 moves downwardly together with the mold clamping block 6 to be inserted into the injection cavity mold through the neck molds 3 from a hole part 4a which is provided by drilling into the base plate 4. A cavity 7 is formed between the injection cavity mold 1 and the injection core 5, into which the closed-end preform 10 is injection-molded.

Figure 2A:
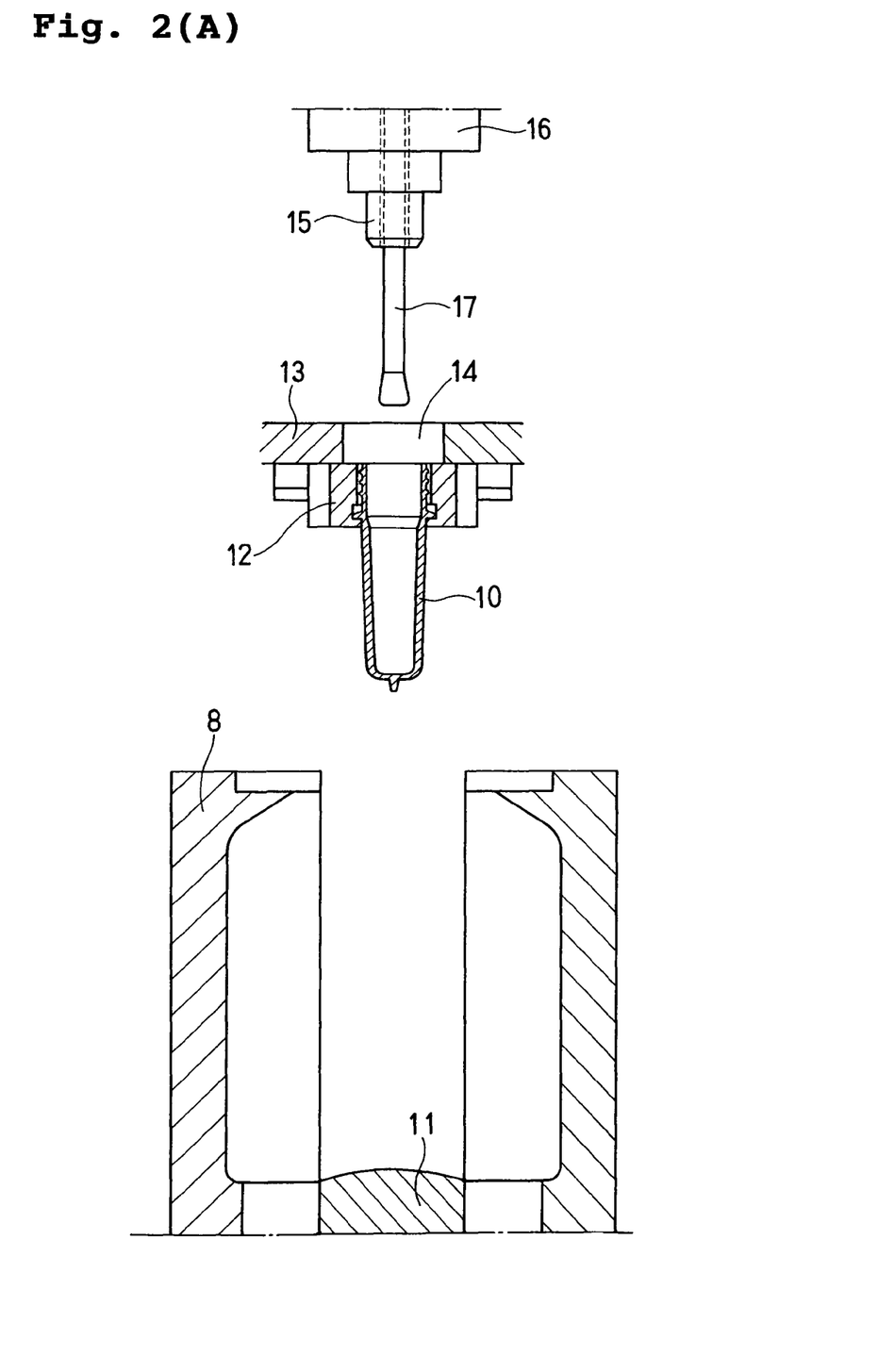
FIG. 2A is a diagram showing a temperature-averaging process of the molding method according to the present invention.
Figure 2B:
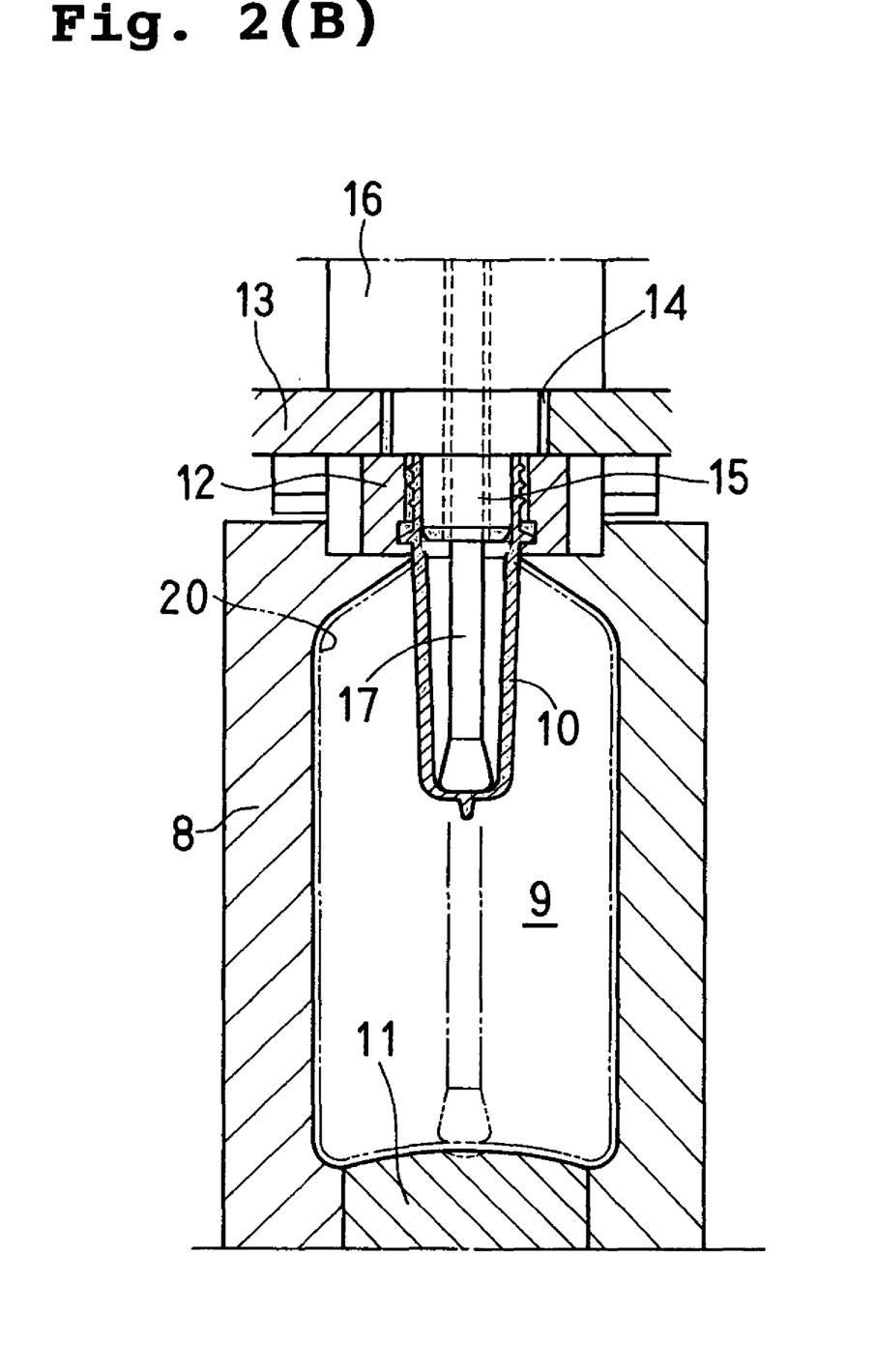
FIG. 2B is a diagram showing a stretch blow molding process of the molding method according to the present invention.

A blow mold 8 for molding a bottle is provided by a pair of split-cavity molds which open and close from the right and left. A bottom mold 11 is provided at the center of the bottom part of the blow cavity 9. The upper side aperture periphery is made to be a concave spot in which holders 12 supporting the neck part of the preform 10 are fitted.

Ejecting plates 13 combine with a support of the preform 10 by a pair of plate bodies that open and shut to the right and left, not shown in the drawings, and which are provided in reciprocating transfer from a halting position of the preform 10 to the central upper part of the blow mold 8 and also are vertically movable to the blow mold 8, and to the under side of the hole parts 14 which are provided by drilling to the butting edge of the plate body. The above mentioned holders 12 are provided separately from the pair of plate bodies.

A blow core 15 is provided on a vertical movement block 16 which is movable into the hole part of the ejecting plates 13 in a downward direction. In the internal part center, a stretch rod 17 is inserted and is movable up and down, and an air flow gap is provided in the periphery of the stretch rod 17. The stretch rod 17 moves vertically together with the blow core 15, and after the stretch rod is fitted into the internal side neck part of the preform 10, the blow core 15, independently, extends to the mold side of the above mentioned bottom mold 11.

A molding process of polyethylene terephthalate (PET) as a molding resin is explained as one example.

Figure 1A:
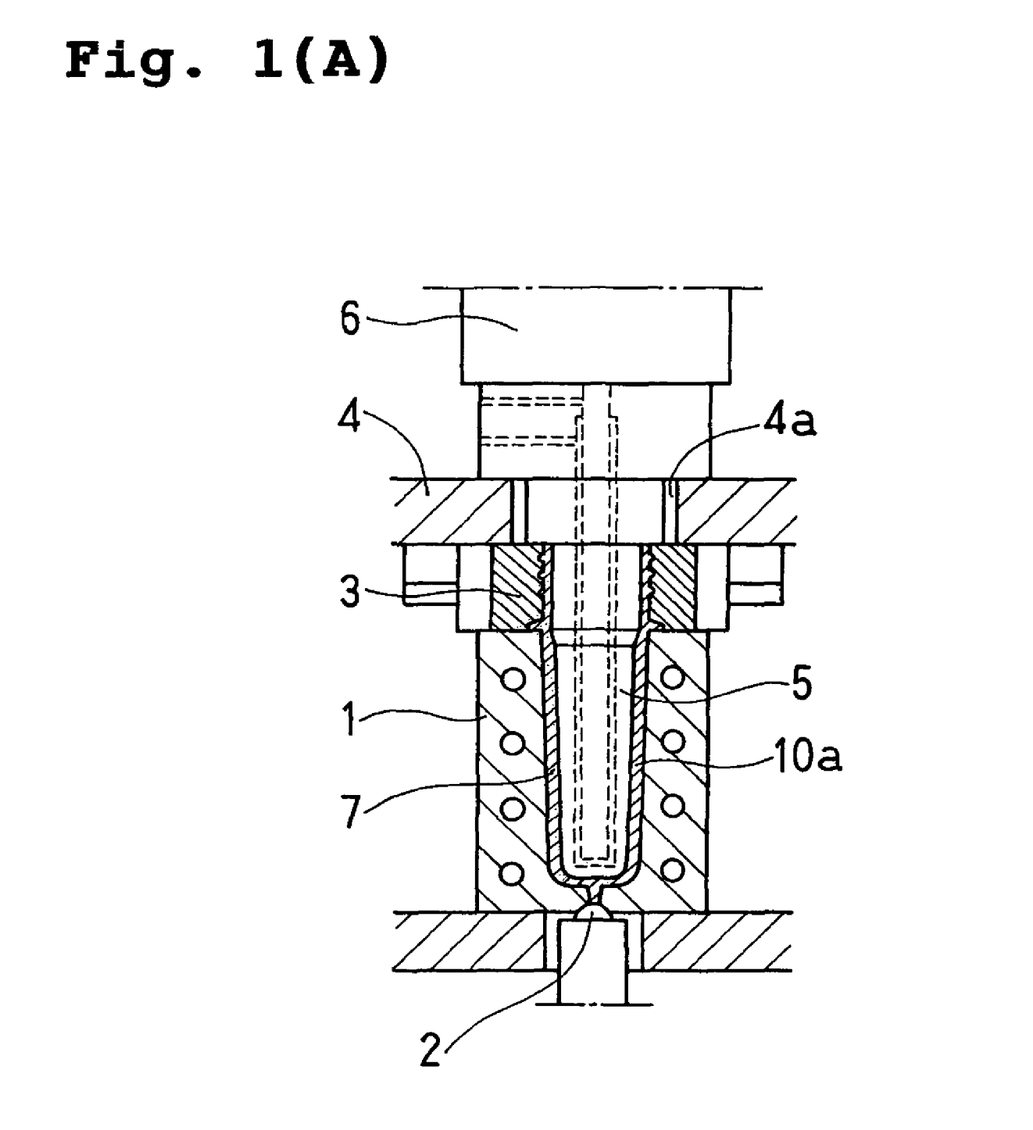
FIG. 1A is a diagram showing an injection process of the molding method according to the present invention.

Initially, as shown in FIG. 1A, molten (254° C.) polyethylene terephthalate is injected and filled from the injection nozzle 2 into the cavity 7 formed by mold clamping, and the melt 10a generated in the cavity 7 is rapidly cooled by both the injection cavity mold 1 and the injection core 5 which are set in the temperature range of 3° C. to 20° C. The cooling temperature 3° C. is the lower limit temperature for accelerating the cooling rate, and 20° C. is the upper limit temperature which is set when the temperature or humidity of the molding environment is high. The set temperature in general is 15° C.±3° C.

As for the neck molds 3, since the thickness of the neck part of the preform 10 is thinner than the body part, the neck part is solidified by cooling until mold-release by the heat transfer which is generated while the neck molds 3 are in contact with the injection cavity mold 1 by the mold clamp, so a cooling means is not provided.

The melt 10a is formed to the preform 10 by rapid cooling (hereinafter called an injection co ling) from both cooling by the injection cavity mold 1 (hereinafter called an outer side cooling) and cooling by the injection core 5 (hereinafter called an inner side cooling). The injection cooling time is different depending upon the thickness of the body part, but is limited to be within the time that cooling at the inside of the body wall is still incomplete in a high temperature state, and mold-release is possible from the injection cavity mold 1 together with the perform 10 sticking to the injection core 5.

The injection cooling time is preferably, in the case of the average body part thickness t=3 mm (hereinafter called t=3), 2 seconds to 5 seconds, in the case of t=4 mm (hereinafter called t=4), 5 seconds to 8 seconds, and in the case of t=5 mm (hereinafter called t=5), 6 seconds to 10 seconds, for the purpose of ensuring the internal part heat. If the injection cooling is conducted for longer than the above mentioned time, the region of the outer side skin layer caused by cooling increases, and the high temperature region of the internal part becomes more narrow, and heat softening of the inner and outer surface layers by the internal part heat after cavity mold-release is difficult to conduct, so that before stretch below molding, control of the heating temperature of the entire preform by heating an outer part is required.

Figure 1B:
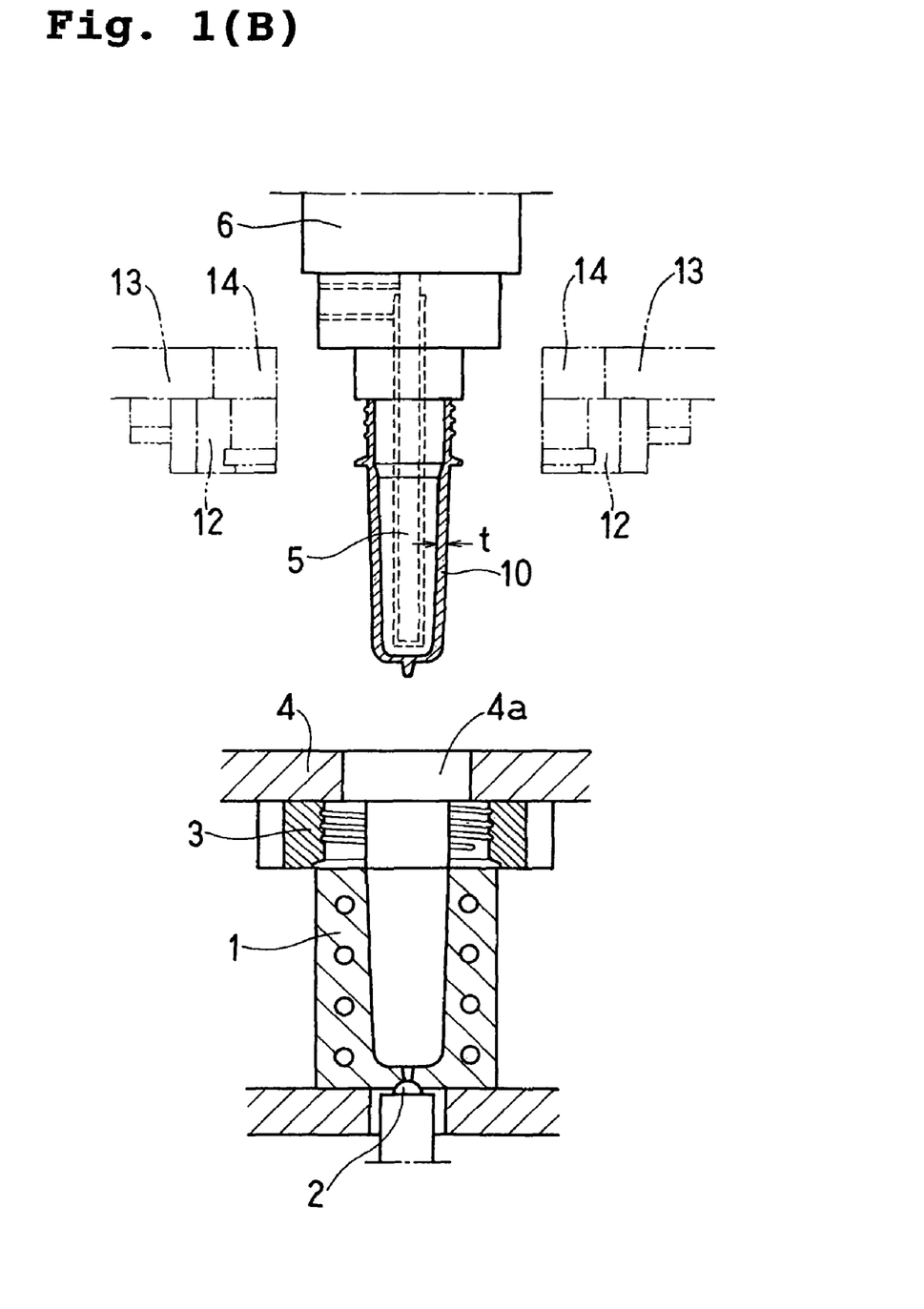
FIG. 1B is a diagram showing an inner cooling process of the molding method according to the present invention.

After the above mentioned injection cooling time, as shown in FIG. 1B, the mold-release of the neck part is conducted by opening the neck molds 3 to the right and left, and then the mold clamp block 6 is moved upwardly. The injection core 5 is mold-released (hereinafter called a cavity mold release) by withdrawing it from the injection cavity mold 1 together with the preform 10. The outer surface temperature of the preform 10 after the cavity mold-release (after approximately 2 seconds), is preferably 105° C. to 120° C. in the case of t=3, 91° C. to 96° C. in the case of t=4, and 88° C. to 97° C. in the case of t=5.

During the cavity mold-release, even if the skin layer thickness generated in the outer side of the preform 10 is thin, in the periphery of the injection core 5, shrinkage of the inner side of the preform by rapid cooling causes the preform 10 to stick tightly to the injection core 5. The preform 10 is mold-released together with the injection core 5 from the injection cavity mold 1 so that the form of the preform 10 is not impaired by the cavity mold-release. After the cavity mold-release, the preform 10 is transferred together with the injection core 5 to a halting position which is located opposite the injection cavity mold 1 by a 180° rotating-turn of the transfer plate, not shown in the drawings.

With cavity mold-release, cooling of the preform 10 from the outer side terminates, the skin layer of the outer surface exposed to the atmosphere disappears by heat dissipation, and the outer surface temperature rises to a peak temperature. On the other hand, with the injection core 5 stuck to the preform 10, until the perform 10 is mold-released from the injection core (hereinafter called a core mold-release) for the setting time, the preform 10 is cooled from the inner side continuously by the injection core. Accordingly, the temperature distribution in the inside of the body part wall of the preform 10 varies from a mountain shape in which the center temperature is high by cooling from both sides at the cavity mold-release, to a slope shape with a temperature gradient which is high at the outer side and is low at the inner side.

The cooling time of inner side is preferably selected according to the above mentioned injection cooling time in the region of, for example, preferably 4 seconds to 8 seconds for the body thickness t=3, 6 seconds to 8 seconds for t=4, and 8 seconds to 12 seconds for t=5. If the inner side cooling is conducted longer than the above mentioned time that is set according to the injection cooling time, cooling proceeds more deeply from the inner side into the internal part, so that as a whole super cooling occurs.

Giving one example, in the case of t=4 and an injection cooling time of 5 seconds, the cross section temperature of the body wall of the preform after approximately 3 seconds from mold-release is 130.51° C. at the outer side, 143.71° C. at the center, and 132.25° C. at the inner side, so that the temperature distribution in the inside of the body wall shows a mountain shape in which the center temperature is high. Then, when the inner side cooling is performed by the injection core 5 for 10 seconds, the cross section temperature after mold-release falls to 116.02° C. at the outer side, 111.96° C. at the center, and 89.20° C. at the inner side, so that the temperature distribution is a steep gradient slope shape in which the inner side temperature is extremely low and the temperature difference between the inner and outer sides is as much as 26.82° C. The temperature difference of the inner and outer sides becomes small over time with the inner side temperature rise from internal part heating and heat dissipation from the outer surface, and the inner side skin layer which is generated softens, but the entire preform temperature drops so low that reheating before stretch blow molding is required.

Even if the inner side coding time is in the above mentioned setting region, since the inner side of the preform 10 is in a supercooling state, when stretch blow molding is conducted immediately after the core mold-release, an uneven thickness occurs and a bottle having a uniform thickness distribution can not be molded. Thus, after the inner side cooling time, the ejecting plates 13 are moved to the halting position of the preform 10, and the preform 10 is held between the holders 12 at the neck part. Subsequent to this holding, the ejecting plate moves upward, and the injection core 5 is drawn from the preform 10, and with the core mold-release, cooling is terminated. After the core mold-release is over, the preform 10 in a hollow state is transferred to the upper central part of the blow mold 8 by the ejecting plates 13, and at that position a temperature-averaging process of the preform 10 is conducted prior to stretch blow molding.

By the temperature-averaging process the preform 10 is left in the hollow state until the outer surface temperature of the preform 10 drops, from the peak temperature (121° C. to 135° C. in the case of t=3, 111° C. to 125° C. in the case of t=4, 125° C. to 135° C. in case of t=5), to a temperature region (123° C. to 118° C. in the case of t=3, 124° C. to 107° C. in the case of 1=4, 134° C. to 129° C. in the case of t=5) that is suitable for stretch blow molding to improve the top load.

During the temperature-averaging time, a thick skin layer of the inner side, caused by contact with the injection core 5, is heated and softened, and simultaneously the inner side temperature is raised from heat in the inner part of the preform 10. Also, in the hollow preform in which only the neck part is opened, dissipated heat from the inner side surface tends to stay inside the hollow preform. By heat accumulation inside the preform, heating of the skin layer is conducted efficiently and the like, so that while the outer surface temperature attains the stretch blow molding temperature after passing the peak temperature, the inner side temperature rises and the outer side temperature drops, and the temperature difference in the body wall becomes small, to a gentle gradient, and the temperature gradient becomes a homogeneous state as a whole. It is needless to say that the difference in the time to attain the stretch blow molding temperature depends on the setting conditions of temperature and time.

The time that the outer surface temperature is maintained in the stretch blow molding temperature region is longer in comparison with the time from the drop from the peak temperature to the stretch blow molding temperature region. While in such molding temperature region, stretch blow molding can be conducted without a limit based on the time from cavity mold-release. However, if considering the productivity of the mold cycle, a shorter time is preferable to begin the stretch blow molding.

Since the molding temperature region is determined by the passage of time from the cavity mold-release, the temperature-averaging time amounts to the remaining time which is the time from cavity mold-release until stretch blow molding less the inner cooling time for each preform.

When the temperature-averaging time is over, as shown in FIG. 2B, the ejecting plates 13 move downwardly to the mold upper side position, and also, before or after the blow mold 8 shuts, the upward blow core 15 moves downwardly together with the vertical movement block 16. The stretch rod 17 is inserted to the preform 10 and the holders 12 and the blow mold 8 and the blow core 15 are conducted to mold clamping.

Figure 3:
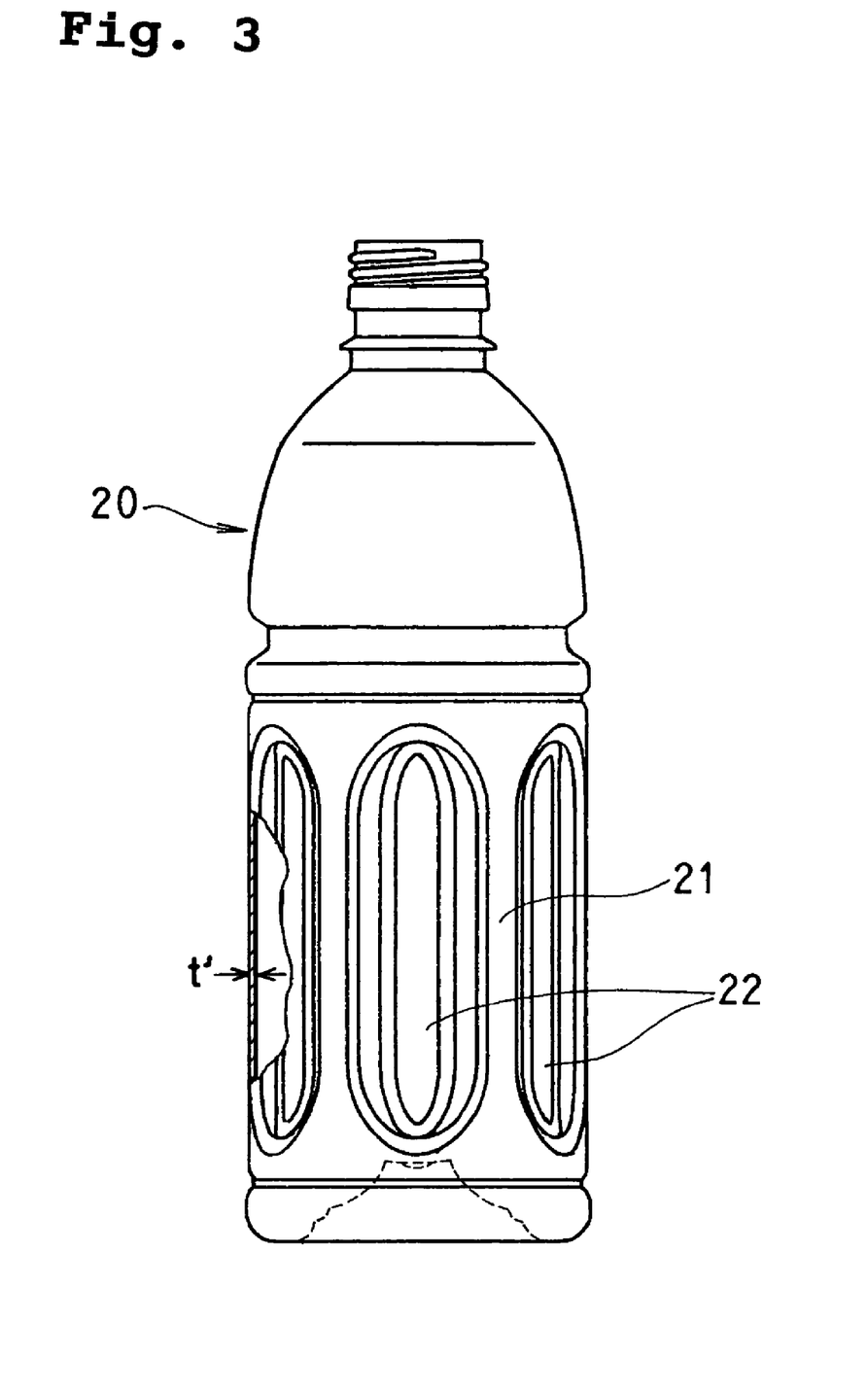
FIG. 3 is a front view of a bottle measured for a top load value.

After this, by an elongation of the vertical stretch of the stretch rod 17 and air blown from the blow core 15, the preform 10 is expanded to the cavity surface of the blow cavity 9, and is molded to a bottle having a thin body part thickness t' (0.25 mm to 3.5 mm). A detailed body part shape of the bottle 20 is omitted in FIGS. 2A and 2B. However, for a bottle for beverages, as shown in FIG. 3, in six region in the side of the body part 21, elliptical panels 22 are provided, which are concave and vertically elongated.

When the bottle 20 having such a form is molded through the above mentioned processes and subsequently measured for the top load value, the results are high values such as 172 to 185 N at the body part thickness of the preform 10 for t=3, 281 to 310 N for t=4 and 283 to 325 for t=5. The improvement of the top load values is speculated to be a result of continuation of the inner side cooling by the injection core 5, such that the temperature distribution varies from a mountain shape to a slope shape with the temperature gradient having a low inner side temperature, and the temperature gradient becomes gradual during the temperature-averaging time after the core mold-release. Also the temperature difference in the body wall is small, so that the difference of degree of orientation depending on temperature becomes small, and the formation of multiple layers (inner side, central part, outer side) of the body wall which is easily generated in the mountain shape temperature distribution, does not occur.

As for the 500 ml bottle for beverages with the above mentioned panels, the top load value based on the bottle weight (preform weight) is preferably 170N or more for the preform body part thickness t=3, 280N or more for t=4 and t=5, so that a top load value which is in excess of the preferred value is able to be evaluated. Accordingly, even by stretch blow molding of the hot parison method, with inner side cooling by the injection core and the subsequent temperature-averaging time setting, a thin wall thickness PET bottle having the improved top load value can be obtained.

Examples are explained as follows.

Example:

Preform:

Material for molding: polyethylene terephthalate (PET), Manufactured by Eastman Chemical Company (9921W)
Dimensions:

Opening diameter: φ21 mm
Thickness (t): three samples: 3 mm, 4 mm, 5 mm
Body diameter (central part): φ23.1 mm
Stretch part length:  74 mm (for t = 3 mm, t = 4 mm)
                     62 mm (for t = 5 mm)

-continued

| | | |
|---|---|---|
| Weight | t = 3 mm | 23.8 g |
| | t = 4 mm | 30.6 g |
| | t = 5 mm | 30.6 g |

Molding condition 1: (Preform injection molding)
Barrel heater set temperature 270° C.

Injection time

| | |
|---|---|
| t = 3 mm | 6 seconds |
| t = 4 mm | 10 seconds |
| t = 5 mm | 13 seconds |

Injection mold temperature, Injection core temperature (chiller) 15° C.

| T(mm) | Injection cooling (both sides) | Inner side cooling | Averaging (leaving) |
|---|---|---|---|
| 3 | 2 to 5 | 2 to 8 | 4 or more |
| 4 | 5 to 8 | 5 to 8 | 7 or more |
| 5 | 7 to 10 | 5 to 8 | 8 or more |

Molding condition 2: (Stretch blow molding)
Molding temperature (Outer surface temperature) Atmospheric temperature is 22° C..

| | |
|---|---|
| t = 3 mm | 120° C. to 100° C. |
| t = 4 mm | 120° C. to 100° C. |
| t = 5 mm | 133° C. to 115° C. |
| Blow air pressure | 2.2 MPa |
| Stretch Ratio (vertical) | 2.5 (t = 3 mm, t = 4 mm) |
| | 3.0 (t = 5 mm) |
| Stretch Ratio (horizontal) | 2.98 |

Molded article: Bottle for beverage 500 ml
(body part six sides with panels, Refer to FIG. 3)

Dimensions:

| | |
|---|---|
| Opening diameter | φ21 mm |
| Body diameter (Maximum) | φ68.9 mm |
| Average thickness | t' = 0.28 mm (for t = 3 mm) |
| | t' = 0.32 mm (for t = 4 mm) |
| | t' = 0.33 mm (for t = 5 mm) |

Molding machine used: AOKI-100LL-20
Temperature measuring instrument: Infrared thermograph TVS-2000MK2 (Manufactured by Nippon Avionic Co., Ltd.
Top load measuring instrument: Tensile compression testing instrument TCM-200 (Manufactured by Minebea Co., Ltd.)

Figure 4:
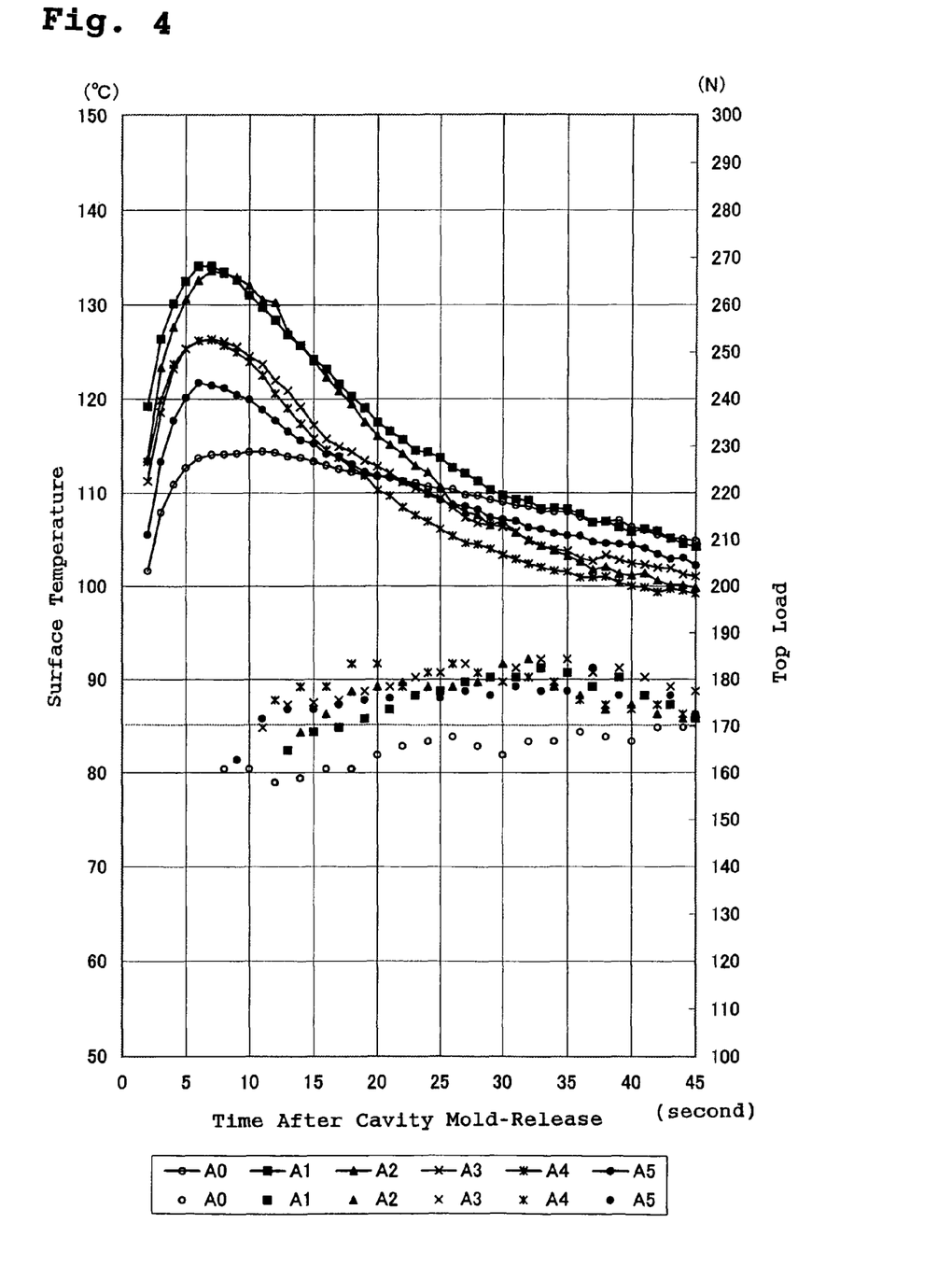
FIG. 4 is a graph illustrating an outer surface temperature after cavity mold-release of a preform having a body part thickness t=3 mm together with a Comparative Example.

FIG. 4 shows the outer surface temperature after cavity mold-release of the injection molded preform (t=3 mm) under molding condition 1. FIG. 4 also shows the top load value of the obtained bottle in which the preform is molded by stretch blow molding in the stretch blow molding temperature region (120° C. to 100° C.) under molding condition 2. Five Examples are shown, wherein A1, A2, A3, A4, and A5 have different cooling times (second) and temperature-averaging times (second) from the injection time of 6 seconds, together with Comparative Example A0. Here, the temperature-averaging time of A0 is the time from the cavity mold-release to the stretch blow molding (considering time).

|    | Cooling time (second) | Inner Side Cooling time (second) | Temperature-averaging time (second) | Top Load Value (Newton) |
|----|----|----|----|----|
| A1 | 2 | 7 | 12, 16, 34 | 172, 177, 177 |
| A2 | 2 | 8 | 8, 10, 28 | 173, 178, 177 |
| A3 | 3 | 5 | 8, 10, 40 | 174, 175, 178 |
| A4 | 3 | 6 | 6, 8, 30 | 176, 178, 176 |
| A5 | 3 | 4 | 7, 15, 39 | 172, 176, 177 |
| A0 | 4 | 0 | 8, 20, 32 | 161, 164, 169 |

Figure 5:
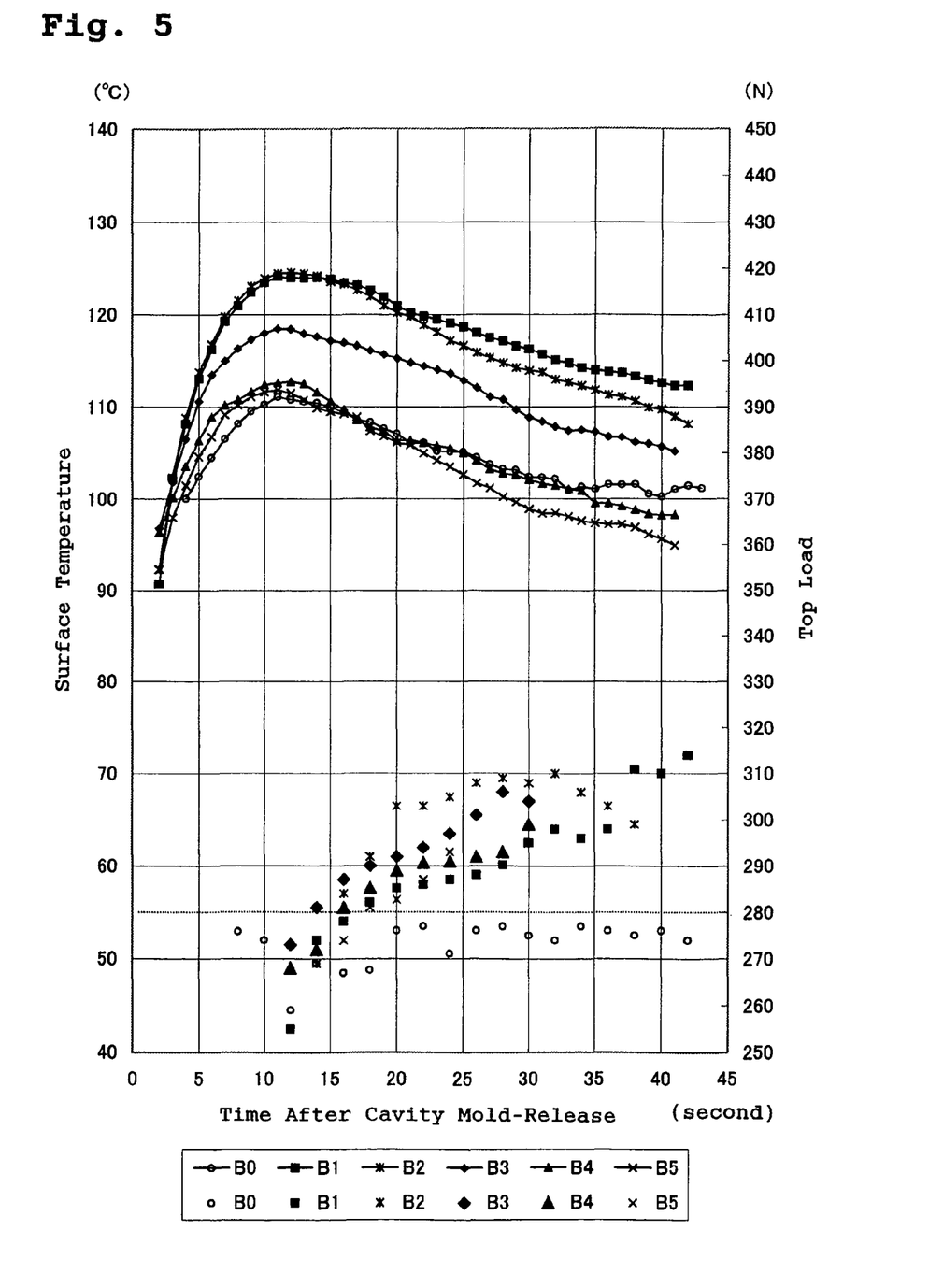
FIG. 5 is a graph illustrating an outer surface temperature after cavity mold-release of a preform having a body part thickness t=4 mm together with a Comparative Example.

FIG. 5 shows the outer surface temperature after cavity mold-release of the injection molded preform (t=4 mm) under molding condition 1. FIG. 4 also shows the top load value of the obtained bottle in which the preform is molded by stretch blow molding in the stretch blow molding temperature region (120° C. to 100° C.) under the molding condition 2. Five Examples are shown, wherein B1, B2, B3, B4, and B5 have different cooling times and temperature-averaging times (second) from the injection time of 10 seconds, together with Comparative Example B0 as the conventional method in which inner side cooling by the injection core is not conducted. Here, the temperature-averaging time of B0 is the time from the cavity mold-release to the stretch blow molding.

|    | Cooling time (second) | Inner Side Cooling time (second) | Temperature-averaging time (second) | Top Load Value (Newton) |
|----|----|----|----|----|
| B1 | 5 | 6 | 12, 22, 36 | 280, 290, 314 |
| B2 | 5 | 8 | 8, 10, 28 | 284, 292, 299 |
| B3 | 6 | 6 | 8, 12, 24 | 281, 290, 304 |
| B4 | 7 | 6 | 10, 16, 24 | 281, 291, 299 |
| B5 | 7 | 8 | 10, 16, — | 281, 293, — |
| B0 | 8 | 0 | 8, 24, 30 | 277, 278, 275 |

Figure 6:
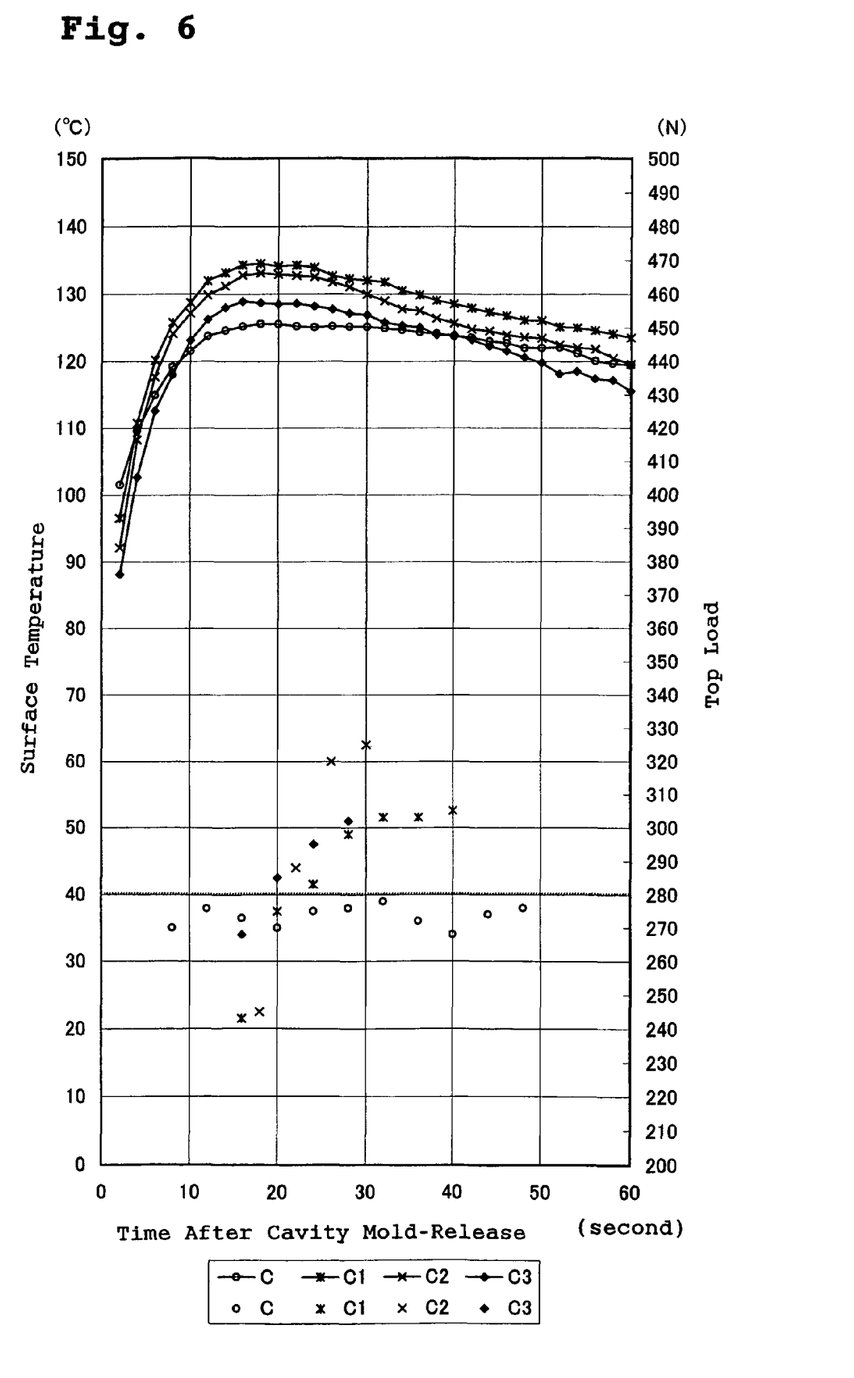
FIG. 6 is a graph illustrating an outer surface temperature after cavity mold-release of a preform having a body part thickness t=5 mm together with a Comparative Example.

FIG. 6 shows the outer surface temperature after cavity mold-release of the injection molded preform (t=5 mm) under the molding condition 1. FIG. 6 also shows the top load value of the obtained bottle in which the preform is molded by stretch blow molding in the stretch blow molding temperature region (125° C. to 115° C.) under the molding condition 2. Three Examples are shown, wherein C1, C2, and C3 have different cooling times and the temperature-averaging times (second) from the injection time of 13 seconds, together with Comparative Example C0 as the conventional method in which inner side cooling by the injection core is not conducted. Here, the temperature-averaging time of C0 is the time from the cavity mold-release to stretch blow molding.

|    | Cooling time (second) | Inner Side Cooling time (second) | Temperature-averaging time (second) | Top Load Value (Newton) |
|----|----|----|----|----|
| C1 | 6 | 8 | 16, 20, 32 | 283, 298, 305 |
| C2 | 6 | 12 | 10, 14, 20 | 288, 320, 325 |
| C3 | 8 | 8 | 8, 16, 20 | 285, 295, 302 |
| C0 | 8 | 0 | 8, 24, 28 | 270, 275, 276 |

As seen in FIG. 4 to FIG. 6, it is obvious that, generally, the longer the averaging time is, the top load value is made to be higher. This is caused by the temperature difference between the inner and outer sides being small and approaching equivalence over time, and also no difference is made in the stretch degree so that the body wall constitutes a single layer.

However, in case of Comparative Examples A0, B0, C0, in which inner side cooling is not conducted, even if the stretch blow molding is conducted in the stretch blow molding temperature region after the peak temperature, the top load values are not improved. After cavity mold-release in the Comparative Examples, the central part has the high temperature and the temperature distribution forms a mountain shape. Even if the outer surface temperature drops to the stretch blow molding temperature region, the temperature distribution has a mountain shape, and the orientation degree of molecular orientation by stretch is low as temperature rise, so that from the difference of the orientation degree, the body wall is formed into three layers (inner side, center side, outer side), although this is not so notable, which is speculated to affect the compression strength.

TABLE 1

| Thickness | Mark | Condition | Peak Temperature Temperature | Time to Peak Temperature | Stretch Blow Molding(1) | | | Stretch Blow Molding(2) | | | Stretch Blow Molding(3) | | |
|---|---|---|---|---|---|---|---|---|---|---|---|---|---|
| | | | | | Time From Mold-Release | Temperature | Top Load | Time From Mold-Release | Temperature | Top Load | Time From Mold-Release | Temperature | Top Load |
| FIG. 4 | A1 | 6 + 2 + 7 | 134.08 | 6 | 19 | 119.04 | 172 | 23 | 114.52 | 177 | 41 | 106.15 | 177 |
| t = 3 | A2 | 6 + 2 + 8 | 133.60 | 7 | 16 | 122.31 | 173 | 18 | 119.45 | 178 | 36 | 102.63 | 177 |
| | A3 | 6 + 3 + 5 | 126.40 | 7 | 13 | 120.92 | 174 | 15 | 117.23 | 175 | 45 | 101.06 | 178 |
| | A4 | 6 + 3 + 6 | 126.29 | 7 | 12 | 120.61 | 176 | 14 | 117.39 | 178 | 36 | 100.97 | 176 |
| | A5 | 6 + 4 + 4 | 120.96 | 6 | 11 | 118.89 | 172 | 19 | 112.21 | 176 | 43 | 102.88 | 177 |
| FIG. 5 | B1 | 10 + 5 + 6 | 124.07 | 11 | 18 | 122.61 | 282 | 28 | 117.12 | 290 | 42 | 112.27 | 314 |
| t = 4 | B2 | 10 + 5 + 8 | 124.54 | 12 | 16 | 123.28 | 284 | 18 | 121.98 | 292 | 38 | 110.63 | 299 |
| | B3 | 10 + 6 + 6 | 118.43 | 11 | 14 | 117.91 | 281 | 18 | 116.07 | 290 | 30 | 108.85 | 304 |
| | B4 | 10 + 7 + 6 | 112.72 | 12 | 16 | 109.67 | 281 | 22 | 106.10 | 291 | 30 | 102.05 | 299 |
| | B5 | 10 + 7 + 8 | 111.80 | 11 | 18 | 107.36 | 281 | 24 | 103.50 | 293 | | | |
| FIG. 6 | C1 | 13 + 6 + 8 | 134.49 | 18 | 24 | 133.93 | 283 | 28 | 132.24 | 298 | 40 | 128.52 | 305 |
| t = 5 | C2 | 13 + 6 + 12 | 133.10 | 18 | 22 | 132.72 | 288 | 26 | 131.72 | 320 | 32 | 130.01 | 325 |
| | C3 | 13 + 8 + 8 | 128.90 | 16 | 20 | 128.50 | 285 | 24 | 128.20 | 295 | 28 | 127.09 | 302 |

Remarks:
Condition(time) Injection + cooling + inner side cooling
Time(second) Temperature (° C.) Top Load (N)

In Table 1, the molding condition of the above mentioned Examples and the peak temperature and time, molding time from the cavity mold-release, molding temperature, top load value and the like are listed. The time from mold-release is described as the preform being drawn from the cavity mold together with the injection core until the stretch blow molding is started (inner side cooling time+temperature-averaging time). It is obvious from the table that, even if the body thickness of the preform varies, if the outer surface temperature is dropping after the maximum peak, the top load value is higher than 170N at t=3 mm, 280N at t=4 mm, t=5 mm which is regarded as the above mentioned standard value.

TABLE 2

| Thickness | Mark | Condition | Peak Temperature | | Stretch Blow Molding | | |
| --- | --- | --- | --- | --- | --- | --- | --- |
| | | | Temperature | Time to Peak Temperature | Time From Mold Release | Temperature | Top Load |
| t = 3 | A0 | 6 + 5 + 0 | 114.43 | 11 | 8 | 114.10 | 161 |
| t = 4 | B0 | 10 + 8 + 0 | 111.05 | 11 | 8 | 108.14 | 276 |
| t = 5 | C0 | 13 + 10 + 10 | 125.58 | 18 | 8 | 119.22 | 270 |

The comparison with the conventional method in the Comparative Examples is shown in Table 2. In the conventional method, which is conducted by stretch blow molding in the molding temperature before the surface temperature reaches the peak temperature, the top load values are 161N at t=3 mm, 278N at t=4 mm and 270N at t=5 mm. Accordingly, the present invention is extremely useful for the hot parison method stretch blow molding, for the purpose of improving the top load in a bottle having a thin body part.

As for the above mentioned Examples, while polyethylene terephthalate is used as a base resin, the present invention is applicable to thermoplastics resins such as polyethylene naphthalate, polycarbonate, polypropylene, polyethylene and the like, which are able to be stretch blow molded by the hot parison method. Therefore, the present invention is not limited to polyethylene terephthalate as the base resin. Also, while the present invention is applicable to a wide-mouth bottle as a hollow molded article, the present invention is not limited only to a bottle.

What is claimed is:
1. A method for injection stretch blow molding in a hot parison method, which comprises the steps of:
  injecting and filling a molten polyethylene terephthalate into a cavity formed by an injection cavity mold, a neck mold, and an injection core;
  forming a closed-end preform having an integral body part and a neck part, with the body part having a thickness of 3 mm to 5 mm, by cooling the melt for 2 seconds to 10 seconds in the cavity by both heat transfer contact between the injection cavity mold, set to a temperature of 3° C. to 20° C., and an outer side of the body part, and heat transfer contact between the injection core, set to a temperature of 3° C. to 20° C., and an inner side of the body part;
  mold-releasing the preform from the injection cavity mold together with and in heat transfer contact with the injection core while the body part and a bottom part of the preform are in a high temperature state, the preform having an outer surface temperature of the body part of 120° C. to 88° C. at a time of about 2 seconds elapsing after the mold-release on the injection core, depending on the body part thickness of 3 mm to 5 mm;
  holding the preform on the injection core while the outer surface temperature of the body part rises to a peak temperature of between 111° C. to 135° C. by only heat accumulation in the inside of the preform after the mold-release from the injection cavity mold;
  continuing cooling the inner side of the preform by heat transfer contact with said injection core for an inner side cooling time of 4 seconds to 12 seconds depending on the body part thickness of 3 mm to 5 mm;
  terminating the cooling of the inner side of the preform by mold-release of the perform from the injection core while holding the preform at the neck part thereof;
  transferring the preform, in a hollow state, to an upper central part of a blow mold, while an inner surface temperature of the body part rises by heat transfer only from heat accumulated within the inside of the preform in the hollow state;
  leaving the preform in the hollow state for a time comprising a temperature-averaging time during which the outer surface temperature of the body part drops from the peak temperature to a stretch blow molding temperature range and an inner thick skin layer of the preform in the hollow state is softened by heat transfer only from heat accumulated within the inside of the preform in the hollow state; and
  while the preform is still in the stretch blow molding temperature range, stretch blow molding the preform to a thin-wall bottle with a body part thickness having an average thickness of 0.28 mm to 0.33 mm and with a top load value of 172-325 N.

* * * * *

UNITED STATES PATENT AND TRADEMARK OFFICE
CERTIFICATE OF CORRECTION

PATENT NO. : 8,021,596 B2
APPLICATION NO. : 11/451612
DATED : September 20, 2011
INVENTOR(S) : Yutaka Yoshiike et al.

It is certified that error appears in the above-identified patent and that said Letters Patent is hereby corrected as shown below:

Column 4, line 66, "co ling" should read --cooling--;

Column 5, line 20, "below" should read --blow--;

Column 6, line 43, "1=4," should read --t=4,--;

Column 7, line 22, "region" should read --regions--; and

Column 8, between lines 20-21, please insert the following header: --Cooling and Averaging time (seconds)--.

Signed and Sealed this
Fourth Day of December, 2012

David J. Kappos
*Director of the United States Patent and Trademark Office*